US008941863B1

(12) United States Patent
Gilson et al.

(10) Patent No.: US 8,941,863 B1
(45) Date of Patent: Jan. 27, 2015

(54) TECHNIQUES FOR IMAGE DUPLICATION OPTIMIZATION

(75) Inventors: Raymond Wesley Gilson, St. Paul, MN (US); Thomas William Schlender, Lino Lakes, MN (US)

(73) Assignee: Symantec Corporation, Mountain View, CA (US)

( * ) Notice: Subject to any disclaimer, the term of this patent is extended or adjusted under 35 U.S.C. 154(b) by 404 days.

(21) Appl. No.: 12/954,954

(22) Filed: Nov. 29, 2010

(51) Int. Cl.
*G06F 3/12* (2006.01)

(52) U.S. Cl.
USPC ........ 358/1.15; 358/1.16; 358/1.18; 713/375; 713/400; 360/69; 707/609; 707/610; 711/111

(58) Field of Classification Search
CPC ..... G06F 3/0613; G06F 3/0659; G06F 3/068; G06F 3/0682
See application file for complete search history.

(56) References Cited

U.S. PATENT DOCUMENTS

| | | | | |
|---|---|---|---|---|
| 5,884,328 A * | 3/1999 | Mosher, Jr. | ............................ | 1/1 |
| 6,286,085 B1 * | 9/2001 | Jouenne et al. | ............... | 711/162 |
| 6,502,205 B1 * | 12/2002 | Yanai et al. | .................. | 714/6.32 |
| 6,804,689 B1 * | 10/2004 | Havrda et al. | ................. | 707/661 |
| 6,839,801 B2 * | 1/2005 | Jaquette | ......................... | 711/111 |
| 7,020,767 B2 * | 3/2006 | Alverson et al. | .............. | 712/227 |
| 7,266,636 B2 * | 9/2007 | Jaquette | ......................... | 711/111 |
| 7,363,330 B1 * | 4/2008 | Ellman et al. | .................. | 707/620 |
| 7,409,512 B1 * | 8/2008 | Kekre et al. | .................... | 711/161 |
| 7,454,444 B2 * | 11/2008 | Kagle et al. | ............................ | 1/1 |
| 7,965,462 B2 * | 6/2011 | Demura et al. | ................. | 360/40 |
| 7,995,303 B2 * | 8/2011 | Karp et al. | ................. | 360/73.04 |
| RE43,032 E * | 12/2011 | Gaertner et al. | .............. | 711/114 |
| 8,171,489 B2 * | 5/2012 | Liu et al. | ........................ | 718/108 |
| 8,171,498 B2 * | 5/2012 | McInerney | ...................... | 719/318 |
| 8,176,243 B2 * | 5/2012 | Katori et al. | .................. | 711/111 |
| 8,234,443 B2 * | 7/2012 | Katagiri | ......................... | 711/111 |
| 8,306,053 B2 * | 11/2012 | Fellman et al. | ................ | 370/462 |
| 2003/0063408 A1 * | 4/2003 | Beeston et al. | .................. | 360/69 |
| 2003/0065667 A1 * | 4/2003 | Dahman et al. | ................ | 707/100 |
| 2003/0074521 A1 * | 4/2003 | Beeston et al. | ................ | 711/111 |
| 2003/0120740 A1 * | 6/2003 | Beeman et al. | ............... | 709/213 |
| 2004/0003302 A1 * | 1/2004 | Marshall et al. | .............. | 713/300 |
| 2004/0068523 A1 * | 4/2004 | Keith et al. | .................... | 707/200 |
| 2004/0133737 A1 * | 7/2004 | Jaquette | ......................... | 711/111 |
| 2004/0133924 A1 * | 7/2004 | Wilkins et al. | ................ | 725/135 |
| 2004/0266435 A1 * | 12/2004 | de Jong et al. | ................ | 455/436 |
| 2005/0108471 A1 * | 5/2005 | Jaquette | ......................... | 711/111 |
| 2005/0289243 A1 * | 12/2005 | McInerney | ...................... | 709/248 |
| 2008/0079972 A1 * | 4/2008 | Goodwin et al. | ............. | 358/1.12 |
| 2008/0154968 A1 * | 6/2008 | Eastman et al. | .............. | 707/200 |

(Continued)

OTHER PUBLICATIONS

"A CommVault White Paper: CommVault® Galaxy™ Backup & Recovery," CommVault Systems, Inc.; 2008; 42 pages.

(Continued)

*Primary Examiner* — King Poon
*Assistant Examiner* — Ted Barnes
(74) *Attorney, Agent, or Firm* — Wilmer Cutler Pickering Hale and Dorr LLP

(57) ABSTRACT

Techniques for image copying optimization are disclosed. In one particular exemplary embodiment, the techniques may be realized as a method for image copying optimization comprising receiving a request to copy a plurality of images, copying one or more of the plurality of images, deferring synchronization for each of the one or more of the plurality of images, receiving an indication to stop deferring synchronization, and synchronizing the one or more copied images of the plurality of images.

20 Claims, 4 Drawing Sheets

(56) References Cited

U.S. PATENT DOCUMENTS

| | | | |
|---|---|---|---|
| 2009/0049107 A1* | 2/2009 | Yamaguchi et al. | 707/201 |
| 2009/0125570 A1* | 5/2009 | Bailey et al. | 707/204 |
| 2009/0196282 A1* | 8/2009 | Fellman et al. | 370/352 |
| 2010/0138385 A1* | 6/2010 | Palermiti et al. | 707/610 |
| 2010/0174807 A1* | 7/2010 | Lyman et al. | 709/221 |
| 2010/0325091 A1* | 12/2010 | Petruzzo | 707/659 |
| 2011/0051280 A1* | 3/2011 | Karp et al. | 360/73.01 |
| 2011/0137879 A1* | 6/2011 | Dubey et al. | 707/704 |
| 2012/0216112 A1* | 8/2012 | McInerney | 715/255 |

OTHER PUBLICATIONS

"IBM Tivoli Storage Manager Version 5.5—Using the Application Programming Interface," International Business Machines Corporation; 2007; 328 pages.

CommVault Data Sheet; "CommNet Service Manager 7.0," found at: http://www.commvault.com/pdf/DS_CNSM_Overview.pdf; 2007; 5 pages.

* cited by examiner excellent# TECHNIQUES FOR IMAGE DUPLICATION OPTIMIZATION

FIELD OF THE DISCLOSURE

The present disclosure relates generally to transferring image data and, more particularly, to techniques for image duplication optimization.

BACKGROUND OF THE DISCLOSURE

Transfer of data for backup, archival, or other purposes may require verification and/or synchronization of units of data, such as images. The verification and/or synchronization may ensure that an error in the transfer of data to storage media has not occurred and that data has been successfully transferred to storage media (e.g., written to tape). The verification and/or synchronization may be a more significant factor in overall backup or archive times as other factors (e.g., transfer time and write time) improve.

In view of the foregoing, it may be understood that there may be significant problems and shortcomings associated with current data transfer technologies.

SUMMARY OF THE DISCLOSURE

Techniques for image copying optimization are disclosed. In one particular exemplary embodiment, the techniques may be realized as a method for image copying optimization comprising receiving a request to copy a plurality of images, copying one or more of the plurality of images, deferring synchronization for each of the one or more of the plurality of images, receiving an indication to stop deferring synchronization, and synchronizing the one or more copied images of the plurality of images.

In accordance with other aspects of this particular exemplary embodiment, the techniques may include determining whether synchronization has succeeded, and failing all of the one or more copied images of the plurality of images in the event that synchronization has not succeeded.

In accordance with further aspects of this particular exemplary embodiment, the techniques may include retrying copying of the one or more copied images of the plurality of images for which synchronization failed.

In accordance with additional aspects of this particular exemplary embodiment, deferring synchronization may comprise writing an asynchronous filemark after each of the one or more copied images of the plurality of images.

In accordance with additional aspects of this particular exemplary embodiment, the asynchronous filemark may be performed by setting an immediate bit of a SCSI Write Filemarks command.

In accordance with additional aspects of this particular exemplary embodiment, synchronizing the one or more copied images of the plurality of images may comprise copying an image of the plurality of images and writing a synchronous filemark.

In accordance with additional aspects of this particular exemplary embodiment, receiving an indication to stop deferring synchronization may comprise receiving an indication that a batch size has been exceeded.

In accordance with additional aspects of this particular exemplary embodiment, receiving an indication to stop deferring synchronization may comprise receiving an indication that a specified number of images has been copied.

In accordance with additional aspects of this particular exemplary embodiment, receiving an indication to stop deferring synchronization may comprise receiving an indication that a specified period of time has elapsed.

In accordance with additional aspects of this particular exemplary embodiment, the techniques may include determining whether synchronization is deferrable for the plurality of images prior to copying one or more of the plurality of images.

In accordance with additional aspects of this particular exemplary embodiment, the techniques may be realized as at least one non-transitory processor readable storage medium for storing a computer program of instructions configured to be readable by at least one processor for instructing the at least one processor to execute a computer process for performing the method.

In another particular exemplary embodiment, the techniques may be realized as an article of manufacture for image copying optimization, the article of manufacture comprising at least one non-transitory processor readable medium, and instructions stored on the at least one medium. The instructions may be configured to be readable from the at least one medium by at least one processor and thereby cause the at least one processor to operate so as to receive a request to copy a plurality of images, copy one or more of the plurality of images, defer synchronization for each of the one or more of the plurality of images, receive an indication to stop deferring synchronization, and synchronize the one or more copied images of the plurality of images.

In yet another particular exemplary embodiment, the techniques may be realized as a system for image copying optimization comprising one or more processors communicatively coupled to a network, wherein the one or more processors are configured to receive a request to copy a plurality of images, copy one or more of the plurality of images, defer synchronization for each of the one or more of the plurality of images, receive an indication to stop deferring synchronization, and synchronize the one or more copied images of the plurality of images.

In accordance with additional aspects of this particular exemplary embodiment, the processors may be further configured to determine whether synchronization has succeeded, and fail all of the one or more copied images of the plurality of images in the event that synchronization has not succeeded.

In accordance with additional aspects of this particular exemplary embodiment, the processors may further be configured to retry copying of the one or more copied images of the plurality of images for which synchronization failed.

In accordance with additional aspects of this particular exemplary embodiment, deferring synchronization may comprise writing an asynchronous filemark after each of the one or more copied images of the plurality of images.

In accordance with additional aspects of this particular exemplary embodiment, synchronizing the one or more copied images of the plurality of images may comprise copying an image of the plurality of images and writing a synchronous filemark.

In accordance with additional aspects of this particular exemplary embodiment, receiving an indication to stop deferring synchronization may comprise receiving an indication that a batch size has been exceeded.

In accordance with additional aspects of this particular exemplary embodiment, receiving an indication to stop deferring synchronization may comprise receiving an indication that a specified number of images has been copied.

In accordance with additional aspects of this particular exemplary embodiment, receiving an indication to stop deferring synchronization may comprise receiving an indication that a specified period of time has elapsed.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
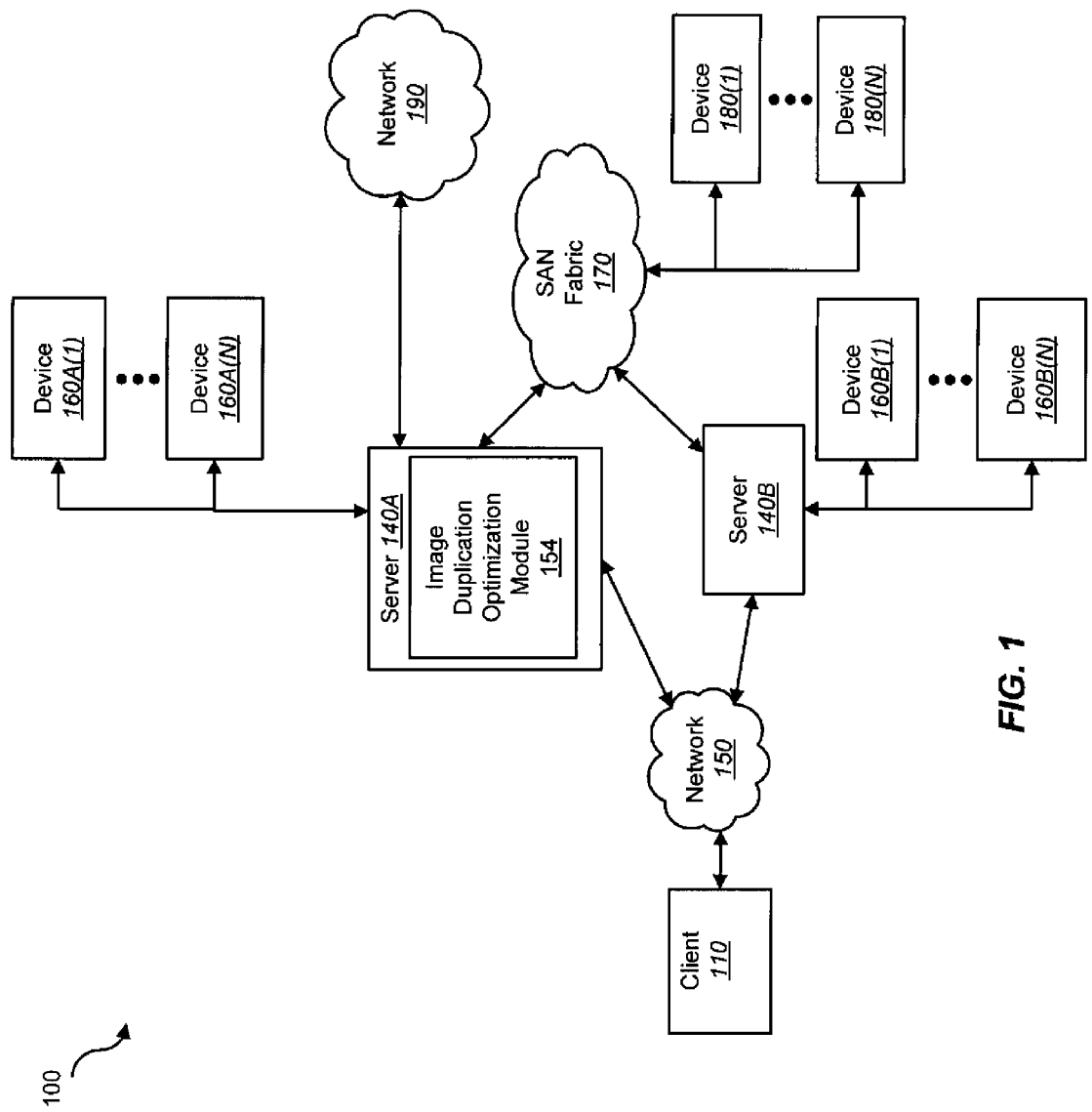
FIG. 1 shows a block diagram depicting a network architecture containing a platform for image duplication optimization in accordance with an embodiment of the present disclosure.

FIG. 1 shows a block diagram depicting a network architecture 100 for image duplication optimization in accordance with an embodiment of the present disclosure. FIG. 1 is a simplified view of network architecture 100, which may include additional elements that are not depicted. Network architecture 100 may contain client system 110 as well as servers 140A and 140B (one or more of which may be implemented using computer system 200 shown in FIG. 2). Client system 110 may be communicatively coupled to a network 150. Server 140A may be communicatively coupled to storage devices 160A(1)-(N), and server 140B may be communicatively coupled to storage devices 160B(1)-(N). Servers 140A and 140B may be communicatively coupled to a SAN (Storage Area Network) fabric 170. SAN fabric 170 may support access to storage devices 180(1)-(N) by servers 140A and 140B, and by client system 110 via network 150. Server 140A may be communicatively coupled to network 190.

The description below describes network elements, computers, and/or components of a system and method for image duplication optimization that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Server 140A may be a platform containing image duplication optimization module 154.

Figure 2:
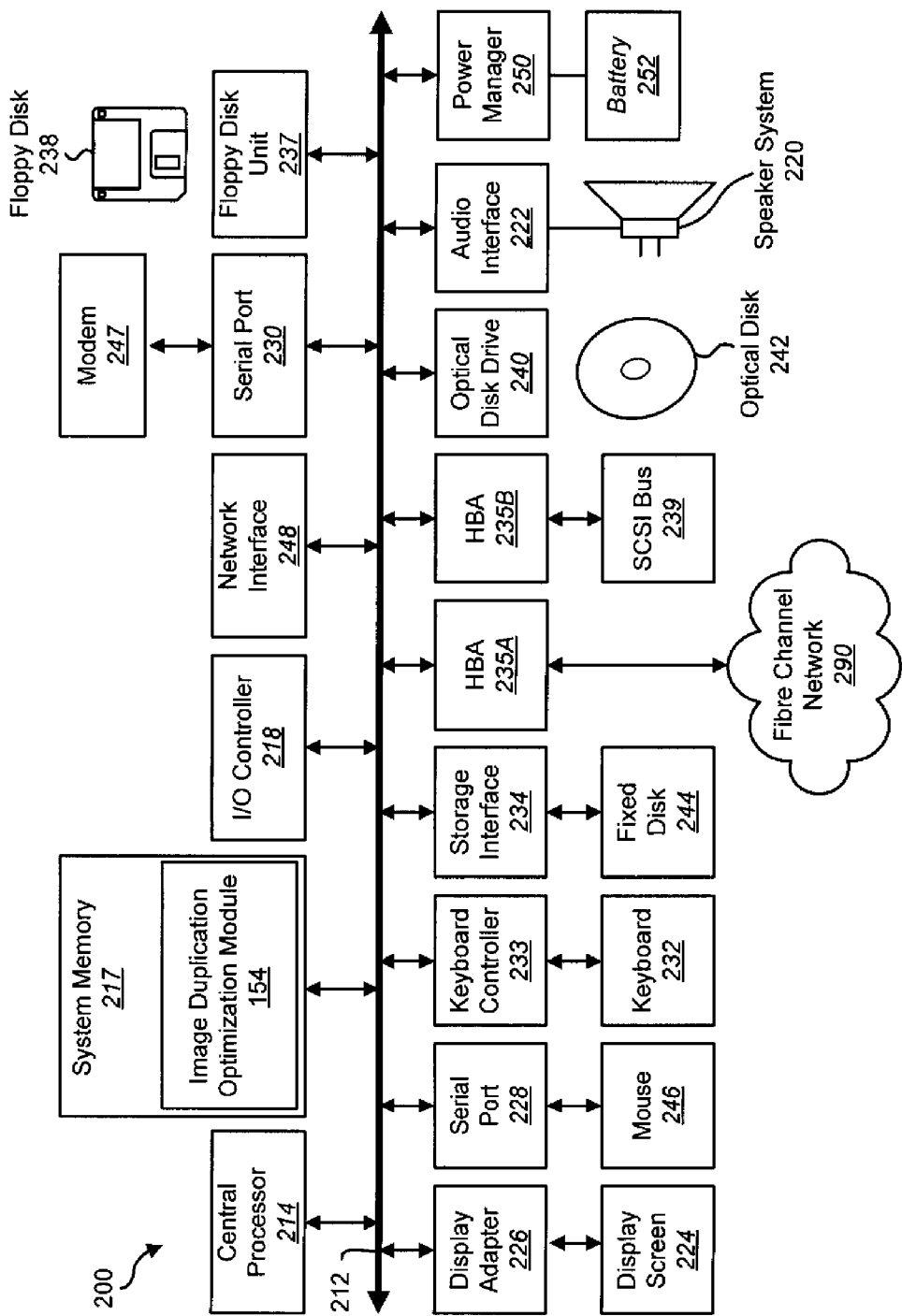
FIG. 2 depicts a block diagram of a computer system in accordance with an embodiment of the present disclosure.

With reference to computer system 200 of FIG. 2, modem 247, network interface 248, or some other method may be used to provide connectivity from one or more of client system 110 to network 150. Client system 110 may be able to access information on server 140A or 140B using, for example, a web browser or other client software. Such a client may allow client system 110 to access data hosted by server 140A or 140B or one of storage devices 160A(1)-(N), 160B(1)-(N), and/or 180(1)-(N).

Networks 150 and 190 may be local area networks (LANs), wide area networks (WANs), the Internet, cellular networks, satellite networks, or other networks that permit communication between client 110, servers 140, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180(1)-(N) may be network accessible storage and may be local, remote, or a combination thereof to server 140A or 140B. Storage devices 160A(1)-(N), 160B(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup or archival purposes.

According to some embodiments, client 110 may be a smartphone, PDA, desktop computer, a laptop computer, a server, another computer, or another device coupled via a wireless or wired connection to network 150. Client 110 may receive data from user input, a database, a file, a web service, and/or an application programming interface.

Servers 140A and 140B may be application servers, archival platforms, backup servers, network storage devices, media servers, email servers, document management platforms, enterprise search servers, or other devices communicatively coupled to network 150. Servers 140A and 140B may utilize one of storage devices 160A(1)-(N), 160B(1)-(N), and/or 180(1)-(N) for the storage of application data, backup data, or other data. Servers 140A and 140B may be hosts, such as an application server, which may process data traveling between client 110 and a backup platform, a backup process, and/or storage. According to some embodiments, servers 140A and 140B may be platforms used for backing up and/or archiving data.

Image duplication optimization module 154 may optimize one or more data duplications requests. Image duplication optimization module 154 may receive a request to duplicate a plurality of units of data (e.g., images). Image duplication optimization module 154 may determine whether synchronization for one or more of the images may be deferred. Synchronization may take a significantly longer period of time than transitioning from a first image to a second image without Synchronization (e.g., 2 milliseconds for an asynchronous write filemark which may not cause synchronization of an image versus 2 seconds for a synchronous filemark which may cause synchronization of an image). Deferring of synchronization of one or more of the images may allow multiple images to be written and may permit synchronization to occur after all of the images have been flushed to media (e.g., written to tape). According to some embodiments, however, if synchronization of one of a plurality of images for which synchronization has been deferred fails all of the plurality of images may need to be duplicated again.

Image duplication optimization module 154 may determine whether to defer synchronization for one or more images based on several factors. For example, image duplication optimization module 154 may determine whether or not to defer synchronization based on the size of an image. The amount of time to write data may be compared against the amount of time to synchronize or validate the data. For example, if an image size is 1 GB and synchronizing the image takes two seconds and a storage device is capable of writing 1 GB (with compression) in two seconds, the cost of re-duplicating the image in case of error may be at least equal to that of synchronizing the image. The cost of synchronizing the image may be even greater if synchronization between writing of multiple images causes a storage device to switch modes (e.g., from writing to verification) and starting a second image after synchronizing a first requires additional work (e.g., reposition writing mechanisms at a proper place on storage media, locating a proper place on storage media for the beginning of a second image, etc.). However, if an image size is large enough such that synchronization may be a smaller percentage of time that it would take to write such an image, image duplication optimization module 154 may decide to synchronize the image immediately after writing it. Other factors may include, but are not limited to, an importance of an image, a time window permitted for duplication, a number of images for which synchronization was previously deferred, and a historical error rate of one of more duplication components. Image duplication optimization module 154 may use one or more configurable settings to determine whether or not to defer synchronization of an image. For example, image duplication optimization module 154 may contain or access a maximum image size setting which may indicate the maximum size of an image that is deferrable. Image duplication optimization module 154 may contain or access other settings such as, for example, a maximum number of images to defer, a maximum amount of time to go without synchronization, a time window to complete duplication, or error data associated with one or duplication components. According to some embodiments, image duplication optimization module 154 may receive an indication of a priority of one or more images and may use priority to determine whether or not synchronization is performed for a particular image. For example, higher priority images may be synchronized before lower priority images. Image duplication optimization module 154 may contain or receive information about one or more components of a duplication process and settings may be based on or adjusted according to this information (e.g., a speed of a tape drive).

According to some embodiments, image duplication optimization module 154 may only defer synchronization for images already present on a media server, backup server, or other storage, and not for data being streamed or backed up from a client. Thus, failure of duplication of an image may be less significant than failure of a backup of data from a client. The point in time data may already be saved in a first copy of an image.

According to at least one embodiment, image duplication optimization module 154 may defer synchronization using an asynchronous filemark. For example, image duplication optimization module 154 may set an immediate bit of a SCSI Write Filemarks command. Image duplication optimization module 154 may continue transferring images and deferring synchronization of the images. Image duplication optimization module 154 may determine or receive an indicator to stop deferring images. For example, a setting may be reached (e.g., a maximum batch size value of 8 may be set and a seventh image has been transferred, an image exceeding a maximum deferrable size may be received, or a maximum period of time may have elapsed).

After deferring synchronization for one or more images, image duplication optimization module 154 may synchronize the images. According to some embodiments, image duplication optimization module 154 may synchronize the one or more copied images of the plurality of images by copying an image of the plurality of images using a synchronous filemark (e.g., using a SCSI Write Filemark command without the immediate bit set). Transferring an image followed by a synchronous filemark may cause that image to be synchronized and as a result any preceding images which have not been synchronized may be synchronized. Image duplication optimization module 154 may determine whether synchronization (i.e., validation) has succeeded. According to some embodiments, if synchronization has not succeeded image duplication optimization module 154 may fail all of the one or more copied images of the plurality of images. For example, if a writing process or daemon (e.g., bptm of Netbackup) detects an error, the writing process may raise, share, or propagate the error to a duplication process handling duplication for a plurality of images (e.g., bpduplicate of Netbackup). Duplication jobs for the failed images to be retried (e.g., automatically by duplication drivers). According to some embodiments, image duplication optimization module 154 may track one or more failed jobs and may use these as a factor when determining whether to defer synchronization (e.g., a images of a job being retried may be synchronized after each image).

According to some embodiments, image duplication optimization module 154 may perform other optimization steps to increase image duplication optimization. For example, during some image transfers (e.g., an Multiplexed (MPX) write to tape media) an Empty Header (EH) may be written when a final active image is completed. A check for another image, or the TERMINATE message may have been done after the EH write. If a new image was received, the EH may have had to been removed from the media.

Image duplication optimization module 154 may check for a next message prior to writing the EH, so that an EH doesn't have to be removed if another image is about to start. This may be significant (e.g., some physical tape devices take 20 seconds to write and then remove an EH.)

Image duplication optimization module 154 may prevent the creation of unnecessary empty fragments. For example, traditionally during MPX write, a five to ten second delay existed to allow the next image to start before a new fragment was created. Image duplication optimization module 154 may now check for the presence of either a new image to start or available data to write before starting a new fragment. Thus, once data is available, a write operation can start. By verifying that data is available, no empty fragments may be created that may have had to been removed. According to some embodiments, while data is available, image duplication optimization module 154 may ignore any next image for the first four seconds after creating a new fragment (balance minimum fragment size with time to write a FM)

According to some embodiments, other optimizations may include increasing a polling rate for next image. For example, the polling rate may be increased from once per second to ten times per second. While this may increase CPU usage, it may recognize the fact that the impact of CPU usage has changed with the general increase in performance and the number of available CPU's in a server over time. This may achieve significant improvements. For example, this may change an average response time from 0.5 seconds to 0.05 seconds.

According to some embodiments, image duplication optimization module 154 may use asynchronous Write Filemark commands whenever backup management software does not need to know immediately that data made it to media. For example, fragments that are terminated due to data complete but metadata (e.g., TIR) to follow, max-frag size, next image start, and single image failure (MPX), may use an asynchronous Write Filemark. Backup management software (e.g., NBU) may not need to know that this part of the data made it, because more data may be written before the backup is complete. However, data for which backup management software must be aware of completion (e.g., fragments that are terminated due to an image completing, or a checkpoint) may use a synchronous Write Filemark.

Additionally, other image duplication scenarios may use asynchronous filemarks (e.g., creating multiple copies simultaneously with multiple tape drives may use the asynchronous filemark form followed by the synchronous filemark form so that data flush may be done in parallel across multiple tape drives).

According to some embodiments, image duplication optimization module 154 may provide other functionality. For example, image duplication optimization module 154 may provide a Tape Drive Append Only mode. Image duplication optimization module 154 may use a SCSI Stream Commands (SSC-4) data protection feature for tape drives called "Append Only Mode". This may causes a tape drive to prevent the overwrite of data on a cartridge unless the writing application performs a pre-authorization for the overwrite. Pre-authorization for overwrite may be a done with a new SCSI command (Allow Overwrite) that may inform the drive that the data block at the current location is going to be overwritten. An attempt to overwrite a data block without pre-authorization may return a write protect error.

FIG. 2 depicts a block diagram of a computer system 200 in accordance with an embodiment of the present disclosure. Computer system 200 is suitable for implementing techniques in accordance with the present disclosure. Computer system 200 may include a bus 212 which may interconnect major subsystems of computer system 210, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM may be the main memory into which the operating system and application programs may be loaded. The ROM or flash memory can contain, among other code, the Basic Input-Output system (BIOS) which controls basic hardware operation such as the interaction with peripheral components. Applications resident with computer system 210 may be stored on and accessed via a computer readable medium, such as a hard disk drive (e.g., fixed disk 244), an optical drive (e.g., optical drive 240), a floppy disk unit 237, or other storage medium. For example, image duplication optimization module 154 may be resident in system memory 217.

Storage interface 234, as with the other storage interfaces of computer system 210, can connect to a standard computer readable medium for storage and/or retrieval of information, such as a fixed disk drive 244. Fixed disk drive 244 may be a part of computer system 210 or may be separate and accessed through other interface systems. Modem 247 may provide a direct connection to a remote server via a telephone link or to the Internet via an Internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 210 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
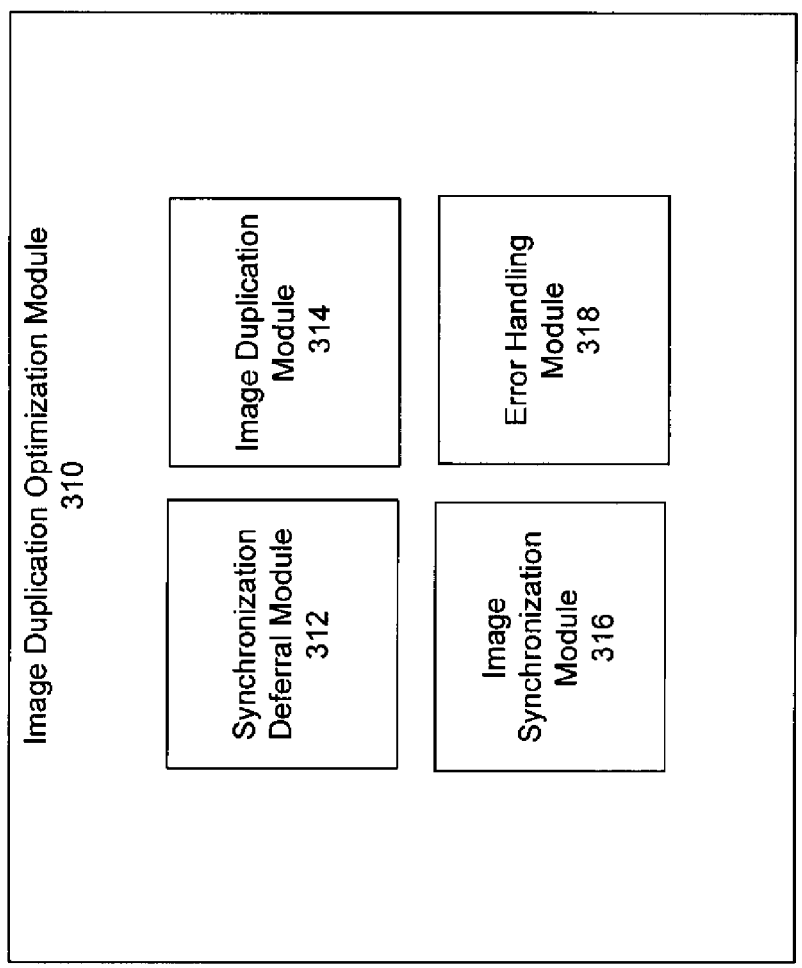
FIG. 3 shows a module for image duplication optimization in accordance with an embodiment of the present disclosure.

Referring to FIG. 3, there is shown a transfer optimization management 310 in accordance with an embodiment of the present disclosure. As illustrated, the transfer optimization management 310 may contain one or more components including synchronization deferral module 312, image duplication module 314, image synchronization module 316, and error handling module 318.

Synchronization deferral module 312 may determine whether or not to defer synchronization for one or more images. Synchronization deferral module 312 may evaluate one or more factors including, but not limited to, a size of an image, an importance of an image, a time window permitted for duplication, a number of images for which synchronization was previously deferred, and a historical error rate of one of more duplication components. Synchronization deferral module 312 may use one or more configurable settings to determine whether or not to defer synchronization of an image. For example, synchronization deferral module 312 may contain or access a maximum image size setting which may indicate the maximum size of an image that is deferrable. Synchronization deferral module 312 may contain or access other settings such as, for example, a maximum number of images to defer, a maximum amount of time to go without synchronization, a time window to complete duplication, or error data associated with one or duplication components. According to some embodiments, synchronization deferral module 312 may receive an indication of a priority of one or more images and may use priority to determine whether or not synchronization is performed for a particular image. For example, higher priority images may be synchronized before lower priority images. Synchronization deferral module 312 may contain or receive information about one or more components of a duplication process and settings may be based on or adjusted according to this information (e.g., a speed of a tape drive).

Image duplication module 314 may duplicate one or more images. Image duplication module 314 may receive an indicator from synchronization deferral module 312 indicating whether or not synchronization should be performed for each of the one or more images. If synchronization is not to be performed image duplication module 314 may perform duplicate an image and then may defer synchronization using an asynchronous filemark. For example, image duplication module 314 may set an immediate bit of a SCSI Write Filemarks command.

Image synchronization module 316 may synchronize (i.e., validate) one or more images. According to some embodiments, Image synchronization module 316 may synchronize the one or more copied images of a plurality of images by copying an image of the plurality of images using a synchronous filemark (e.g., using a SCSI Write Filemark command without the immediate bit set). Transferring an image followed by a synchronous filemark may cause that image to be synchronized and as a result any preceding images which have not been synchronized may be synchronized.

Error handling module 318 may determine whether synchronization (i.e., validation) has succeeded. According to some embodiments, if synchronization has not succeeded Error handling module 318 may fail all of the one or more copied images of the plurality of images. For example, if a writing process or daemon (e.g., bptm of Netbackup) detects an error, the writing process may raise, share, or propagate the error to a duplication process handling duplication for a plurality of images (e.g., bpduplicate of Netbackup). Duplication jobs for the failed images to be retried (e.g., automatically by duplication drivers).

Figure 4:
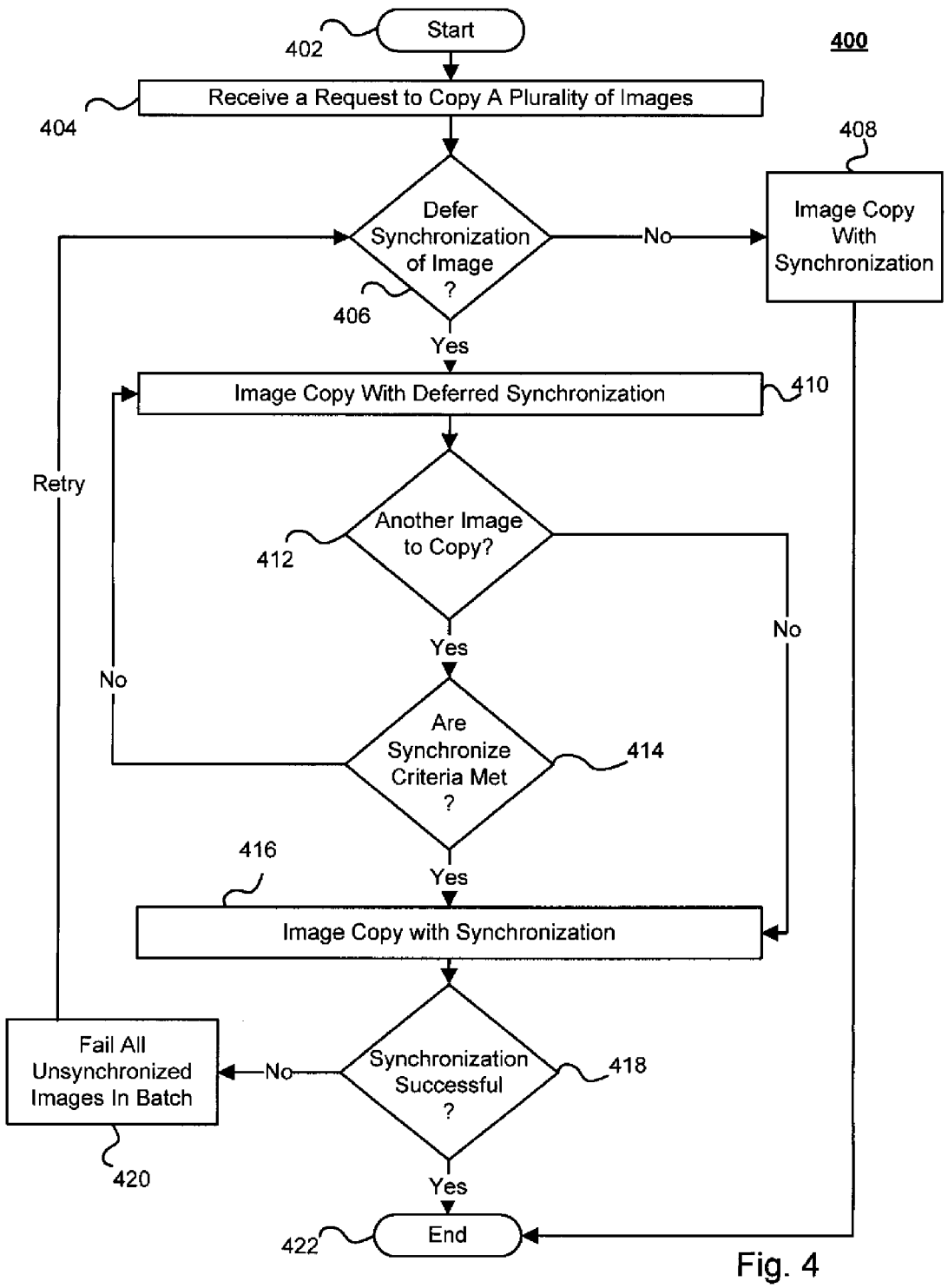
FIG. 4 depicts a method for image duplication optimization in accordance with an embodiment of the present disclosure.

Referring to FIG. 4, there is depicted a method 400 for image duplication optimization in accordance with an embodiment of the present disclosure. At block 402, the method 400 may begin.

At block 404, a request may be received to duplicate a plurality of images.

At block 406, it may be determined whether synchronization of an image should be deferred. If synchronization of an image is to be deferred, the method may continue at block 410. If synchronization of an image is not to be deferred, the method may continue at block 408.

At block 408, an image copy may be performed followed by a synchronous filemark. This may cause synchronization (e.g., validation) of the image.

At block 410, an image copy with deferred synchronization may be performed (e.g., an image copy followed by an asynchronous filemark).

At block 412, it may be determined whether another image is to be duplicated. If another image is to be duplicated, the method may continue at block 414. If no further images are to be duplicated, the method may continue at block 416.

At block 414, it may be determined whether one or more synchronization criteria are met. For example, a setting may be reached (e.g., a maximum batch size value of 8 may be set and a seventh image has been transferred, an image exceeding a maximum deferrable size may be received, or a maximum period of time may have elapsed). If one or more synchronization criteria are met, the method may continue at block 416. If synchronization criteria are not met, the method may return to block 410.

At block 416, after deferring synchronization for one or more images, the images may be synchronized. According to some embodiments, synchronization may be performed by copying an image of the plurality of images using a synchronous filemark (e.g., using a SCSI Write Filemark command without the immediate bit set). Transferring an image followed by a synchronous filemark may cause that image to be synchronized and as a result any preceding images which have not been synchronized may be synchronized.

At block 418, it may be determined whether synchronization (e.g., validation) has succeeded. If synchronization has not succeeded, the method may continue at block 420. If synchronization has succeeded, the method may continue at block 422.

At block 420, if synchronization has not succeeded, images copied without synchronization may fail. For example, if a writing process or daemon (e.g., bptm of Netbackup) detects an error, the writing process may raise, share, or propagate the error to a duplication process handling duplication for a plurality of images (e.g., bpduplicate of Netbackup). Duplication jobs for the failed images to be retried (e.g., automatically by duplication drivers).

At block 422, the method 400 may end.

At this point it should be noted that image duplication optimization in accordance with the present disclosure as described above typically involves the processing of input data and the generation of output data to some extent. This input data processing and output data generation may be implemented in hardware or software. For example, specific electronic components may be employed in an image duplication optimization module or similar or related circuitry for implementing the functions associated with image duplication optimization in accordance with the present disclosure as described above. Alternatively, one or more processors operating in accordance with instructions may implement the functions associated with image duplication optimization in accordance with the present disclosure as described above. If such is the case, it is within the scope of the present disclosure that such instructions may be stored on one or more processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for image copy optimization comprising:
receiving a request to copy a plurality of images;
determining, using at least one computer processor, whether to defer synchronization between a host and electronic storage for the plurality of images prior to copying one or more of the plurality of images, wherein the determination is based on one or more configurable factors;
copying the one or more of the plurality of images;
in the event it was determined, prior to copying the one or more of the plurality of images, to not defer synchronization, synchronizing each of the one or more of the plurality of images copied;
in the event it was determined, prior to copying the one or more of the plurality of images, to defer synchronization, deferring synchronization for each of the one or more of the plurality of images;
in the event that synchronization has been deferred,
receiving an indication to stop deferring synchronization, wherein the indication is based on a specified setting; and
synchronizing the one or more copied images of the plurality of images in response to the received indication.

2. The method of claim 1, further comprising:
determining whether synchronization has succeeded; and
failing all of the one or more copied images of the plurality of images in the event that synchronization has not succeeded.

3. The method of claim 2, further comprising:
retrying copying of the one or more copied images of the plurality of images for which synchronization failed.

4. The method of claim 1, wherein deferring synchronization comprises writing an asynchronous filemark after each of the one or more copied images of the plurality of images.

5. The method of claim 4, wherein the asynchronous filemark is performed by setting an immediate bit of a Write Filemarks command.

6. The method of claim 1, wherein synchronizing the one or more copied images of the plurality of images comprises writing a synchronous filemark.

7. The method of claim 1, wherein receiving an indication to stop deferring synchronization comprises receiving an indication that a batch size has been exceeded.

8. The method of claim 1, wherein receiving an indication to stop deferring synchronization comprises receiving an indication that a specified number of images has been copied.

9. The method of claim 1, wherein receiving an indication to stop deferring synchronization comprises receiving an indication that a specified period of time has elapsed.

10. The method of claim 1, wherein synchronizing the one or more copied images of the plurality of images is based on at least one of: receiving an indication to stop deferring synchronization in the event that it was determined to defer synchronization, and a determination not to defer synchronization.

11. At least one non-transitory processor readable storage medium for storing a computer program of instructions configured to be readable by at least one processor for instructing the at least one processor to execute a computer process for performing the method as recited in claim 1.

12. An article of manufacture for image copying optimization, the article of manufacture comprising:
at least one non-transitory processor readable medium; and
instructions stored on the at least one medium;
wherein the instructions are configured to be readable from the at least one medium by at least one processor and thereby cause the at least one processor to operate so as to:
receive a request to copy a plurality of images;
determine whether to defer synchronization between a host and electronic storage for the plurality of images prior to copying one or more of the plurality of images, wherein the determination is based on one or more configurable factors;
copy the one or more of the plurality of images;
in the event it was determined, prior to copying the one or more of the plurality of images, to not defer synchronization, synchronizing each of the one or more of the plurality of images copied;
in the event it was determined, prior to copying the one or more of the plurality of images, to defer synchronization, defer synchronization for each of the one or more of the plurality of images;
in the event that synchronization has been deferred,
receive an indication to stop deferring synchronization, wherein the indication is based on a specified setting; and
synchronize the one or more copied images of the plurality of images in response to the received indication.

13. A system for image copying optimization comprising:
one or more processors communicatively coupled to a network; wherein the one or more processors are configured to:
receive a request to copy a plurality of images;
determine whether to defer synchronization between a host and electronic storage for the plurality of images prior to copying one or more of the plurality of images, wherein the determination is based on one or more configurable factors;
copy the one or more of the plurality of images;
in the event it was determined, prior to copying the one or more of the plurality of images, to not defer synchronization, synchronizing each of the one or more of the plurality of images copied;
in the event it was determined, prior to copying the one or more of the plurality of images, to defer synchronization, defer synchronization for each of the one or more of the plurality of images;
in the event that synchronization has been deferred,
receive an indication to stop deferring synchronization, wherein the indication is based on a specified setting; and synchronize the one or more copied images of the plurality of images in response to the received indication.

14. The system of claim 13, wherein the processors are further configured to:
   determine whether synchronization has succeeded; and
   fail all of the one or more copied images of the plurality of images in the event that synchronization has not succeeded.

15. The system of claim 13, wherein the processors are further configured to:
   retry copying of the one or more copied images of the plurality of images for which synchronization failed.

16. The system of claim 13, wherein deferring synchronization comprises writing an asynchronous filemark after each of the one or more copied images of the plurality of images.

17. The system of claim 13, wherein synchronizing the one or more copied images of the plurality of images comprises copying an image of the plurality of images and writing a synchronous filemark.

18. The system of claim 13, wherein receiving an indication to stop deferring synchronization comprises receiving an indication that a batch size has been exceeded.

19. The system of claim 13, wherein receiving an indication to stop deferring synchronization comprises receiving an indication that a specified number of images has been copied.

20. The system of claim 13, wherein receiving an indication to stop deferring synchronization comprises receiving an indication that a specified period of time has elapsed.

* * * * *